United States Patent
Schossig et al.

(10) Patent No.: US 10,768,101 B2
(45) Date of Patent: Sep. 8, 2020

(54) MEASURING DEVICE AND METHOD FOR SENSING DIFFERENT GASES AND GAS CONCENTRATIONS

(71) Applicant: INFRASOLID GMBH, Dresden (DE)

(72) Inventors: Marco Schossig, Dresden (DE);
Volkmar Norkus, Pesterwitz (DE);
Tobias Ott, Dresden (DE)

(73) Assignee: INFRASOLID GMBH, Dresden (DE)

( * ) Notice: Subject to any disclaimer, the term of this patent is extended or adjusted under 35 U.S.C. 154(b) by 0 days.

(21) Appl. No.: 16/098,191

(22) PCT Filed: May 9, 2017

(86) PCT No.: PCT/EP2017/061059
§ 371 (c)(1),
(2) Date: Nov. 1, 2018

(87) PCT Pub. No.: WO2017/194540
PCT Pub. Date: Nov. 16, 2017

(65) Prior Publication Data
US 2019/0120754 A1   Apr. 25, 2019

(30) Foreign Application Priority Data

May 9, 2016 (DE) .......................... 10 2016 108 544
May 9, 2016 (DE) .......................... 10 2016 108 545

(51) Int. Cl.
*G01N 21/3504* (2014.01)
*G01N 21/03* (2006.01)

(52) U.S. Cl.
CPC ....... *G01N 21/3504* (2013.01); *G01N 21/031* (2013.01); *G01N 2201/06113* (2013.01)

(58) Field of Classification Search
CPC ............. G01N 21/3504; G01N 21/031; G01N 2201/06113
See application file for complete search history.

(56) References Cited

U.S. PATENT DOCUMENTS 3,797,942 A * 3/1974 Joly ..................... G01N 21/314
356/410
5,222,389 A   6/1993 Wong
(Continued)

FOREIGN PATENT DOCUMENTS

CN   203908940 U   10/2014
DE   3406175 A1    8/1985
(Continued)

OTHER PUBLICATIONS

International Search Report issued in PCT/EP2017/061059 dated Dec. 7, 2017.

*Primary Examiner* — Dominic J Bologna
(74) *Attorney, Agent, or Firm* — Heslin Rothenberg Farley and Mesiti PC; Nicholas Mesiti (57) ABSTRACT

A measuring device for sensing different gases and gas concentrations, includes an infrared radiation source, a measurement channel, which has an optical path and a gas interaction path, and radiation detectors arranged along the measurement channel. The optical path has a first band-pass interference filter arranged at a first deflection point and a first radiation detector is arranged after the band-pass interference filter. A method that uses the measuring device, includes: measurement radiation is introduced into the measurement channel containing the gas to be measured, the measurement radiation hits the first band-pass interference filter, wherein only radiation of a wavelength defined by the first band-pass interference filter hits the first radiation detector, radiation reflected at the band-pass interference filter is forwarded along the optical path in the measurement channel to a second radiation detector, and the gas concentrations measured by the radiation detectors are evaluated.

17 Claims, 10 Drawing Sheets

(56) References Cited

U.S. PATENT DOCUMENTS

| | | | |
|---|---|---|---|
| 5,773,828 A * | 6/1998 | Akiyama | G01N 21/3504 |
| | | | 250/345 |
| 6,201,245 B1 | 3/2001 | Schrader | |
| 8,003,944 B2 | 8/2011 | Wong | |
| 8,143,581 B2 | 3/2012 | Wong | |
| 2002/0011568 A1 | 1/2002 | Diekmann | |
| 2003/0209669 A1 * | 11/2003 | Chou | G01N 21/3504 |
| | | | 250/343 |
| 2004/0004751 A1 * | 1/2004 | Vilhelmsson | H01S 5/142 |
| | | | 359/245 |
| 2006/0009707 A1 * | 1/2006 | Daniels | A61B 5/083 |
| | | | 600/532 |
| 2012/0235038 A1 | 9/2012 | Nishikawa et al. | |
| 2012/0318981 A1 | 12/2012 | Steiner et al. | |
| 2014/0133011 A1 | 5/2014 | Schwedt et al. | |
| 2018/0356266 A1 * | 12/2018 | Robbins | G01N 21/39 |

FOREIGN PATENT DOCUMENTS

| | | |
|---|---|---|
| DE | 4133481 A1 | 4/1993 |
| DE | 29602282 U1 | 8/1996 |
| DE | 19601873 A1 | 9/1996 |
| DE | 10140998 C2 | 7/2003 |
| DE | 10221708 B4 | 9/2004 |
| DE | 202005010475 U1 | 11/2005 |
| DE | 102004028433 A1 | 1/2006 |
| DE | 102008005572 B4 | 4/2011 |
| EP | 1482301 A1 | 12/2004 |
| JP | 2006275632 A | 10/2006 |
| KR | 1020100052691 A | 5/2010 |
| WO | 2010118749 A1 | 10/2010 |

\* cited by examiner

MEASURING DEVICE AND METHOD FOR SENSING DIFFERENT GASES AND GAS CONCENTRATIONS

CROSS REFERENCE TO RELATED APPLICATIONS

This application is the National Phase filing under 35 U.S.C. § 371 of International Application No.: PCT/EP2017/061059, filed on May 9, 2017, and published on Nov. 16, 2017 as WO 2017/194540 A1, and claims priority to German Application No.: 10 2016 108 544.8, filed on May 9, 2016, and to German Application No.: 10 2016 108 545.6, filed on May 9, 2016. The contents of each of the prior applications are hereby incorporated by reference herein in their entirety.

BACKGROUND ART

The invention relates to a measuring device for sensing different gases and gas concentrations, which comprises a radiation source, a measuring channel having an optical path and a gas interaction path, and radiation detectors arranged along the measuring channel.

The invention also relates to a method for measuring gases and gas concentrations which uses the measuring device according to the invention.

There are two basic types of gas sensors: interacting and non-interacting gas sensors. In the first, a gas has to physically or chemically interact with a sensor element. In this case, the gas comes into contact with one or more components, for example, electrodes, electrolytes, or sensor surfaces of the gas sensor via, for example, oxidation, reduction, or physical adsorption. These interactions necessarily result in a change of the gas sensor, i.e., a change of sensor parameters in dependence on the interacting components of the sensor, for example, a change of the electrolytes interacting with the gas, whereby a regular calibration and finally the replacement of the gas sensor become necessary. The most frequently used interacting gas sensors are, for example, electrochemical sensors, solid-state sensors, and catalytic sensors.

Noninteracting gas sensors, also referred to as interaction-free, are optical gas sensors. For this purpose, only electromagnetic radiation comes into contact with the gas or interacts therewith, wherein a part of the radiation is absorbed by the gas molecules and the gas molecules thereupon change the excitation state thereof. However, the excited gas molecules return into the base state thereof due to collisions with other gas molecules or the sample chamber, and therefore the state of the gas does not change physically or chemically. The wavelength $\lambda$ of the electromagnetic radiation extends in this case from the ultraviolet up into the far infrared spectral range ($\lambda$=0.2 μm to 20 μm). In this case, non-dispersive infrared (NDIR) gas sensors are the interaction-free gas sensors used most. In addition to the simple construction, they are distinguished above all by a high measurement resolution, a long service life, and good long-term stability. The method utilizes the excitation of energy states in molecules, i.e., the vibration excitation of molecular bonds, by infrared radiation. At these molecule-specific rotation and vibration frequencies, infrared radiation is absorbed. Because of the individual molecular structure, each molecule has very specific absorption bands in the infrared spectral range, whereby it can be unambiguously identified. In this case, the infrared spectral range $\lambda$=(2 . . . 20) μm is of technical interest, because the characteristic absorption bands of many compounds are in this spectral range.

The first practically usable NDIR gas sensor was developed in 1938 and is described in patent specification DE 730478. In this construction, the radiation originating from two radiation sources is periodically interrupted by a motor-driven aperture wheel and guided in two pipes separate from one another. The gas or gas mixture to be measured is located in one pipe and a reference gas is located in the other pipe. The radiation then enters two measuring chambers, which contain the gas that is to be detected as a receiver layer. These two measuring chambers are separated from one another gas-tight by a thin membrane. Gas-tight means that no gas is exchanged between the chambers. The membrane forms, with a counter plate arranged in an insulated manner, an electrical capacitor, the capacitance of which can be read off using a measuring instrument. The absorption of the infrared radiation by the gas is therefore detected as a pressure difference by means of a very sensitive microphone. This NDIR gas sensor, which is known as a photoacoustic gas measuring cell, has the significant disadvantages of its structural size and the mechanical susceptibility to vibrations and shocks.

A technology which enabled significantly smaller and more robust NDIR gas measuring devices was finally available with the development of nondispersive, very narrow-band optical filters. These so-called interference filters use the effect of interference in order to filter electromagnetic radiation in dependence on the frequency and/or wavelength. In an embodiment as a bandpass filter, a specific wavelength band is transmitted, while shorter and longer wavelengths are reflected or absorbed. The transmission maximum is defined as the center wavelength (CWL) of the bandpass filter. The bandwidth of the filter is specified by the full width at half maximum (FWHM), i.e., the difference between the two argument values for which the function values have dropped to half of the maximum. The transmission spectrum of the bandpass interference filter is finally selected in such a way that it corresponds to a characteristic absorption band of the gas to be measured. The absorption of the infrared radiation by the measured gas is measured in this case using a very sensitive radiation detector, which is arranged behind the bandpass interference filter.

The radiation attenuation caused by the gas as a result of radiation absorption is finally a measure of the gas concentration. The radiation intensity IM of the measurement wavelength changes in this case as a function of the gas concentration c according to the Lambert-Beer law:

$$I_M = I_0 \cdot e^{\alpha \cdot c \cdot l}$$

wherein $\alpha$ denotes the gas-specific absorption coefficient, l denotes the absorption path length, and $I_0$ denotes the base intensity of the radiation, i.e., in the absence of the measured gas (c=0).

Figure 1:
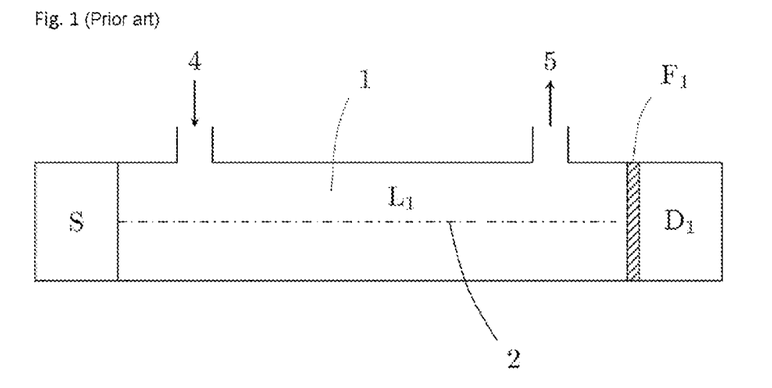
FIG. 1 shows a schematic illustration of the fundamental construction of a simple NDIR gas sensor according to the prior art.

A simple NDIR gas sensor therefore consists of an infrared radiation source, a measuring chamber (cuvette), in which the gas or gas mixture to be measured is located, and also an infrared detector having a bandpass interference filter, the transmission spectrum of which corresponds to the absorption band of the gas to be measured (FIG. 1). These components are installed along an optical axis. Such a construction is described, for example, in the documents DE 10221708 B4 and DE 10013374 A1. In general a thermal radiator which can be electrically modulated is used, which emits electromagnetic radiation having a continuous spectrum as a result of its temperature, in which all wavelengths of the spectral range of technical interest λ=(2 ... 20) μm are included. A broad palette having sufficient signal-to-noise ratio and low price is available as the infrared detector, for example, thermopile sensors and pyroelectric detectors.

Figure 2:
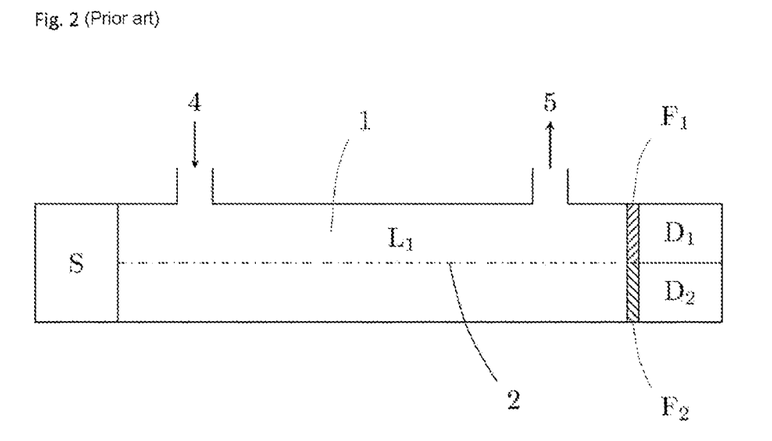
FIG. 2 shows a schematic illustration of the fundamental construction of a simple NDIR gas sensor having reference measurement according to the prior art.

Modern NDIR gas sensors, as are known, for example, from the documents DE 10 2008 005 572 B4, DE 20 2005 010 475 U1, DE 102 21 708 B4, and DE 296 02 282 U1, are usually operated according to the so-called two-frequency method (FIG. 2). In this case, in addition to the measurement at a measurement wavelength adapted to the measured gas, a measurement is additionally carried out at a second wavelength, the so-called reference wavelength, which lies in a spectral range in which no absorption takes place due to other gases present in the gas mixture or in the surroundings. For this purpose, two infrared detectors arranged in the beam path having different bandpass interference filters are necessary. By means of quotient calculation of the two detector signals, a substantial stability improvement is achieved in this case, whereby, for example, signal changes as a result of intensity drifts of the radiation source or dirt deposits in the measuring chamber can be compensated for. However, the required allocation of the radiation flux emitted by the radiation source onto the two infrared detectors is disadvantageous, whereby the radiation intensity at the infrared detector and thus the detection limit of the gas sensor are reduced. FIG. 2 shows the two-frequency method according to the prior art and the required allocation of the radiation emitted by the radiation source S onto the detectors D1 and D2.

However, only one gas can be measured using the above-mentioned measuring methods and measuring devices suitable for this purpose. In many gas-analytic applications, for example, in the case of an exhaust gas, flue gas, or anesthesia gas measurement, however, it is necessary to sense multiple gases simultaneously and determine the concentrations thereof in the gas mixture.

A so-called multispectral detector for NDIR gas sensors is presented in US 2012/0235038 A1, which has a plurality of detector elements having bandpass interference filters. This enables a simple construction of the gas sensor in accordance with the above-described two-frequency method for a simultaneous measurement of multiple gases. Similar arrangements are also known from the documents DE 34 06 175 A1, DE 41 33 481 A1, and DE 101 40 998 C2. Significant disadvantages of such NDIR gas sensors having multispectral detectors are a constant absorption path or cuvette length for all spectral channels and the distribution of the radiation intensity onto the individual detector elements. Thus, for example, in the case of a four-channel detector, in the ideal case only 25% of the incident radiation intensity is available per detector element for signal generation. In reality, it is usually less than 10%. The detection limit of the gas sensor is therefore greatly reduced in the case of all gases to be measured.

A constant absorption path length for all spectral channels limits, on the one hand, the measurement range and, on the other hand, the detection limit of the gas sensor. This results from the fact that firstly every gas has a gas-specific absorption coefficient, secondly gases are usually present in different concentrations in a gas mixture, and thirdly gases have different toxicities, because of which different limit values apply, which in turn require different measurement resolutions. Thus, for example, the respiratory toxins contained in the flue gas of an oil firing, carbon dioxide (CO2), sulfur dioxide (SO2), nitrogen monoxide (NO), and carbon monoxide (CO), are present in the following concentrations:

(125,000 ... 140,000) ppm $CO_2$,
(180 ... 220) ppm $SO_2$,
(80 ... 150) ppm CO, and
(50 ... 100) ppm NO.

The maximum workplace concentrations (MAK values) of these flue gas components can be taken from the technical rules for hazardous substances (TRGS 900) and are:
5000 ppm for $CO_2$,
0.5 ppm for $SO_2$,
25 ppm for NO, and
30 ppm for CO.

The radiation attenuation caused by the gas as a result of radiation absorption according to the Lambert-Beer law is thus individual for each gas and therefore an individual absorption path length is reasonable so that an accurate concentration determination can be carried out. Otherwise, a compromise always has to be made with respect to measurement range and measurement resolution.

A gas sensor device for sensing the gas concentrations in a complex gas mixture is proposed in DE 19604167 A1, in which the individual radiation detectors are arranged rotationally-symmetrically about a radiation source, wherein the distance to the radiation source and thus the absorption path length can vary. The allocation of the emitted radiation flux onto a plurality of radiation detectors remains a significant disadvantage of this arrangement, whereby only a very small fraction of the radiation intensity arrives at the detectors and the detection limit of the gas sensor device is greatly reduced. This also applies to the arrangement described in U.S. Pat. No. 5,222,389 A, in which the individual radiation detectors are arranged along the measuring chamber to implement different absorption path lengths. However, a substantial disadvantage therein is also that only a fraction of the measurement radiation is always incident on the detectors, which is moreover dependent on the respective reflection on the measuring chamber wall.

Furthermore, an NDIR gas sensor having only one radiation detector, in which the selection of the measurement wavelength is performed by a filter wheel, is known from KR 1020100052691 A. This filter wheel can be equipped with matching bandpass interference filters in accordance with the gases to be measured, whereby a variety of gases may be identified using a simple construction. However, this can only take place sequentially. A simultaneous sensing of the concentration of different gases in a gas mixture is not possible. Moreover, the absorption path length for every gas is equal and the arrangement may only be miniaturized poorly.

For an improvement of the detection limit of optical gas sensors, it is necessary to focus the highest possible radiation intensities onto the radiation detector. Furthermore, an individual absorption path length is to be provided for every measured gas, so that an optimum determination of the individual gas concentrations in a complex gas mixture can take place and the structural size of the gas sensor can be kept minimal. For many applications, a simultaneous determination of the components in a gas mixture is moreover required.

SUMMARY OF THE INVENTION

It is therefore the object of the present invention to provide an optical measuring device having a significantly improved detection limit, which is compactly and simply constructed and is producible cost-effectively. The measuring device is to manage without radiation intensity losses and is to have an individually settable absorption path length for different gas-specific absorption coefficients and gas concentrations, wherein a simultaneous determination of the concentration of different gases in a gas mixture is to be possible.

Figure 3:
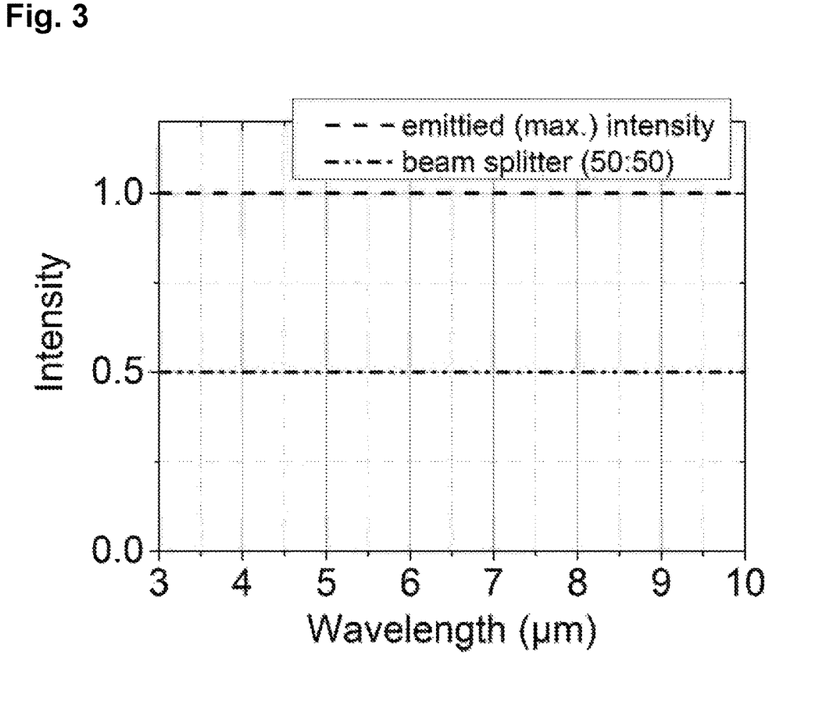
FIG. 3 shows radiation intensity with and without use of a beam splitter.

The object is achieved on the arrangement side in that the optical path has at least one deflection point, wherein a first narrow bandpass interference filter and a first radiation detector downstream of the narrow bandpass interference filter are arranged at a first deflection point and wherein the optical path and the gas interaction path in the measuring channel are identical. A deflection point defines a boundary of the measuring channel and delimits the interacting measuring channel length, i.e., the absorption path length of a specific gas to be measured. The gas interaction path is the path on which the gas or gas mixture to be measured interacts in the measuring channel with the radiation. At the deflection point in the optical path, the measurement radiation is incident on a first narrow bandpass interference filter, wherein only radiation of a wavelength specified by the first narrow bandpass interference filter is incident on a radiation detector downstream of the narrow bandpass interference filter, i.e., only a specific narrow wavelength band is transmitted through the filter, while shorter and longer wavelengths are reflected. Narrowband in the sense of this description means a waveband of <10% of the center wavelength of the narrow bandpass interference filter. The transmission maximum is defined in this case as the center wavelength (CWL) of the narrow bandpass interference filter. The transmission spectrum of the narrow bandpass interference filter is selected in this case such that it corresponds to a characteristic absorption band of the gas to be measured. The absorption of the infrared radiation by the measured gas is measured in this case using a very sensitive radiation detector, which is arranged behind the narrow bandpass interference filter. The radiation reflected on the filter is relayed from the deflection point in the measuring channel until it is incident on the next deflection point. Therefore and because the gas interaction path and the optical path are identical, i.e., are congruent with one another, it is also ensured that no beam splitter is required in the measuring device to conduct the radiation onto multiple radiation detectors or to allocate radiation which is required for a specific gas detection and to provide it to a separate detector for the measurement. A beam splitter splits the radiant power emitted by the radiation source independently of the wavelength into two components and accordingly reduces the radiation intensity (FIG. 3). Omitting beam splitters has the particular advantage that the radiation intensity of the radiation source does not have to be allocated onto various detectors as in the prior art, but rather the maximum radiation intensity is incident on every radiation detector. A substantially improved resolution is thus achieved, because the signal at the detector is greater.

The optical path from the radiation source up to the first deflection point has an absorption path length L1. The absorption path length L is to be designed according to the gas to be detected. This necessity results from the fact that every gas has a gas-specific absorption coefficient and gases are usually present in different concentrations in a gas mixture. Moreover, as a result of, for example, a gas-specific toxicity, a gas-specific measurement resolution is necessary. An individual absorption path length and/or measuring channel length is therefore required for each gas, so that the measuring device can be adapted to the required measurement resolutions and measurement ranges of the gases to be measured.

In one advantageous embodiment of the measuring device according to the invention, the optical path of the measuring device has N deflection points, wherein the optical path has an absorption path length LN from the radiation source up to the Nth deflection point, wherein N is a natural number greater than 1. I.e., the absorption path length of the optical path and thus the length of the gas interaction path can be individually set by the number of the deflection points, and therefore different gases can be measured using different absorption path lengths at the same time. The gas to be studied can be introduced over the entire length of the optical path into the measuring channel.

Furthermore, the narrow bandpass interference filter has an optical axis, wherein the optical path and the optical axis of an Nth narrow bandpass interference filter FN enclose an angle φN. On the one hand, a compact construction of the measuring device is possible due to the angle φ and, on the other hand, the measurement radiation reflected at the narrow bandpass interference filter FN is conducted completely onto the following filter FN+1 in the measuring channel. It is thus guaranteed that the maximum radiation intensity is incident on each detector. The angle φ has a dimension of 0° to less than 90°, preferably a dimension less than 50°, more preferably in a range from 30° to 50°. The angle can be set individually for each deflection point N.

For an optimized radiation detection at the radiation detector, a radiation concentrator can be arranged between the narrow bandpass interference filter and the radiation detector. This radiation concentrator represents a type of collimator and is designed such that the radiation transmitted through the filter is conducted as completely as possible to the radiation detector.

It is advantageous if the substrate material of the narrow bandpass interference filter consists of silicon (Si), germanium (Ge), calcium fluoride ($CaF_2$), barium fluoride ($BaF_2$), or zinc selenide (ZnSe). These materials have a particularly high transmittance in particular in the infrared spectral range, and therefore in accordance with the narrow bandpass interference filter used, a higher radiation proportion is incident on the detector located behind it. However, other substrate materials are also employable and/or usable.

To embody the absorption path length as further variably settable, an optical mirror can be arranged at the deflection point to extend the optical path, i.e., the absorption path length. The path length of the measurement radiation may therefore be extended by the arrangement of mirrors at the deflection points in the measuring channel variably to L=L1+L2+. . . +LN, depending on which absorption path length L is required for the gas to be detected.

Furthermore, a reference detector can be arranged at a deflection point. This has the advantage that therefore, for example, changes in the intensity of the radiation source or contaminants in the measuring channel can be monitored. For example, no absorption by gases takes place at approximately 4 µm wavelength. This wavelength can be used by a reference detector in order to detect changes in the measuring device which are not caused by the gas to be studied. It can be ascertained as a result of changes in the detected signals by the radiation detectors and a reference detector to what extent changes are induced, for example, by aging or a drift of the radiation source or as a result of deposits, for example, on the optical mirrors due to the gas to be measured in the measuring channel. The long-term stability of the gas concentration measurement or gas measurement is improved and the maintenance effort for the gas sensor is reduced by the reference measurement taking place synchronously with the gas concentration measurement, since calibration has to be performed less often.

This type of the reference measurement has the problem that spectral changes in the radiation flux cannot be, or cannot be adequately, compensated for, in particular if the absorption wavelength of the gas is not in the vicinity of the reference wavelength.

In order that spectral changes in the radiation flux due to, for example, deposits in the optical measuring channel, intensity drifts, and emissivity changes of the radiation source and also ambient temperature influences can be completely compensated for and at the same time the long-term stability of NDIR gas sensors can be significantly improved and the maintenance and calibration effort and the costs linked thereto can be minimized and a compact construction can be implemented, it is particularly advantageous if the reference measurement takes place at the absorption wavelength of the gas to be measured. In this type of the reference measurement according to the invention, the reference detector having the reference narrow bandpass interference filter is arranged in the measuring channel after the radiation detector for the gas to be measured. In this case, the reference narrow bandpass interference filter has a greater bandwidth than the narrow bandpass interference filter for the gas to be measured, wherein the transmission ranges of the two filters are overlapping and the reference narrow bandpass interference filter always transmits a range outside the absorption band of the gas to be measured onto the reference detector.

The overlap of the narrow bandpass interference filter in front of a reference detector and the narrow bandpass interference filter in front of a radiation detector is understood in this case as a spectral range in which the transmission ranges of the two filters partially, but not necessarily completely, overlap. An overlap is accordingly present if the bandpasses of the filters used partially overlap, and therefore a common intersecting surface forms in the spectral range.

It is particularly advantageous if the narrow bandpass interference filter in front of a reference detector and/or the narrow bandpass interference filter in front of a radiation detector senses a flank of an absorption band of a gas to be detected with its respective transmission range. This means that either the narrow bandpass interference filter in front of a reference detector senses a flank of an absorption band of a gas to be detected with its respective transmission range or the narrow bandpass interference filter in front of a radiation detector senses a flank of an absorption band of a gas to be detected with its respective transmission range. It is also conceivable that both narrow bandpass interference filters, namely the narrow bandpass interference filter in front of a reference detector and the narrow bandpass interference filter in front of a radiation detector, sense a flank of an absorption band of a gas to be detected, but it has to be ensured that one of the detectors detects a greater spectral range than the respective other detector, wherein the first detector along the measuring channel has to have the smaller transmission range.

As a result of the listed conditions, an offset arises between the signal detection by the radiation detector and the signal detection by the reference radiation detector. This offset is caused by the greater bandwidth of the narrow bandpass interference filter in front of the reference detector, or very generally, of the narrow bandpass interference filter in front of the second detector, which is downstream of the first detector along the measuring channel.

Interfering influences, for example, intensity drifts of the radiation source, influence measuring and reference channel equally, and therefore the signal ratio does not change. Concentration changes of the gas, in contrast, result in a change of the signal ratio. It is particularly advantageous that the previously used compensation methods, such as generating different absorption path lengths or integrating a saturation cell, can be omitted, cf. U.S. Pat. No. 8,003,944 B2 and U.S. Pat. No. 8,143,581 B2. Therefore, on the one hand, a substantially more compact and simpler construction and, on the other hand, a significantly better compensation of interfering influences can be implemented, whereby gas measuring devices having significantly improved long-term stability and therefore lower maintenance costs can be achieved.

In another embodiment, the narrow bandpass interference filter in front of a radiation detector and the narrow bandpass interference filter in front of a reference detector can be designed such that a gas absorption band to be detected can be sensed completely using them. It is also to be ensured in this case that one of the detectors detects a greater spectral range than the respective other detector which is downstream along the measuring channel.

It is also advantageous if the narrow bandpass interference filter in front of a radiation detector has a first center wavelength and the narrow bandpass interference filter in front of a reference detector has a second center wavelength, wherein the first and the second center wavelengths are identical. It is important that the bandwidths, i.e., transmission ranges of the two narrow bandpass interference filters are designed differently and a narrow bandpass interference filter transmits at least a part of the spectrum which lies outside the absorption band of the gas to be detected, so that a radiation detector sees a larger spectral radiation component in order to thus generate an offset, as described above.

The first and the second center wavelengths do not have to be identical, however. They can also differ, wherein it is advantageous if the center wavelengths are located in the region of the gas absorption band to be detected. The selection of the narrow bandpass interference filter in front of a radiation detector and the narrow bandpass interference filter in front of a reference detector has to be made in dependence on the gas to be detected and its characteristic spectral absorption behavior in such a way that the generation of an offset remains ensured.

The first and the second center wavelengths can also be located within the absorption band of the gas to be detected. For this purpose, the narrow bandpass interference filter in front of a reference detector always also has to transmit a part onto the radiation detector which is located outside the characteristic absorption band of the gas. For example, the reference detector detects 30% of the transmission spectrum which is located outside the absorption band of the gas to be detected and 70% of the transmission spectrum which is located inside the absorption band of the gas to be detected.

In one embodiment, the radiation detector and the reference radiation detector can be arranged adjacent to one another at a measuring location, i.e., for example, in a deflection point along the measuring channel. Therefore, for example, the measuring device can be implemented in a particularly compact construction. Moreover, both detectors are located on the same heat sink, whereby ambient temperature variations may be completely compensated for. It is important in this case that a narrow bandpass interference filter is arranged in front of each detector, wherein the transmission range of the narrow bandpass interference filter in front of the radiation detector and the transmission range of the narrow bandpass interference filter in front of the reference detector are formed overlapping and the narrow bandpass interference filter in front of the reference detector or the narrow bandpass interference filter in front of the radiation detector has a greater bandwidth than the respective other narrow bandpass interference filter.

It is particularly advantageous that the measuring device is constructed modularly and the optical path and the gas interaction path are extendable modularly. Modular means that the measuring device is expandable by an optical path length L and a deflection point having a narrow bandpass interference filter and a detector located at this deflection point, but alternatively also a mirror arranged in the deflection point, until, for example, a desired absorption path length is achieved. This mirror can have, for example, a planar, concave, or convex surface.

Furthermore, the optical path can be formed curved and, for example, helical. The construction of the measuring device according to the invention may thus be made very compact, by arranging radiation detectors at defined points of the measuring path in order to set different absorption path lengths for gases to be detected.

The embodiment of the measuring channel having a nearly ideally reflecting layer is advantageous. In particular gilded or chromed surfaces and also mirrored surfaces made of aluminum or stainless steel are suitable for this purpose. The measuring channel does not necessarily have to be understood as a physically bounded space, however. In the meaning of this description, the measuring channel is a space in which the gas or gas mixture to be measured can interact with the radiation of the radiation source, for example, in the form of a channel.

For a compact construction, the measuring device having the detectors, the measuring channel, the narrow bandpass interference filters, the concentrators, and the mirrors and also reference detectors can be arranged integrated on a printed circuit board. The radiation source and the detectors are arranged in this case such that the most space-saving and compact arrangement possible can be implemented. The measuring channel is formed on the printed circuit board, for example, integrated on the printed circuit board. In order to conduct the measurement radiation of the radiation source into the measuring channel, a mirror is used to deflect the measurement radiation into the measuring channel. This also applies to the radiation deflection of the measuring radiation onto the detectors at the deflection points along the optical path inside the measuring channel. For this purpose, a mirror, inter alia, is arranged for beam deflection behind the narrow bandpass interference filter on which the measurement radiation is firstly incident, which deflects the transmitted radiation component onto the detector arranged on the printed circuit board. Therefore, a substantially more compact construction can be implemented, since the horizontal extension can be reduced by the vertical integration of the components of the measuring device, because, for example, the radiation source and the detectors do not have to be arranged in a plane with the measuring channel. The part of the measurement radiation reflected on the narrow bandpass interference filter is conducted further along the optical path through the measuring channel until the measurement radiation is incident on a further narrow bandpass interference filter.

In one particularly advantageous embodiment of the invention, the radiation source is a broadband laser having parallel radiation. This has the advantage that the full intensity of the radiation is always incident on the detector at the deflection points. Reflection and absorption losses as a result of scattering of the radiation in the measuring channel are thus minimal.

Furthermore, in a particularly advantageous embodiment of the measuring device according to the invention, a focusing device for focusing and parallelization of the radiation emitted by the radiation source, in particular if a laser is not used, can be arranged in front of the radiation source. This has the effect that the maximum radiation intensity is incident on the respective deflection points and on the functional units arranged at the deflection points, such as radiation detector, mirror, reference detector, etc.

The object of the present invention is achieved on the method side in that a measurement radiation is introduced by the radiation source into a measuring channel containing the gas or gas mixture to be measured, the measurement radiation is incident on a first narrow bandpass interference filter arranged at a first deflection point, wherein only radiation of a wavelength specified by the first narrow bandpass interference filter is incident on a radiation detector downstream of the narrow bandpass interference filter, the component of the radiation reflected on the narrow bandpass interference filter is conducted along the optical path in the measuring channel onto a second radiation detector and/or mirror, wherein subsequently the analysis of the gas concentrations measured using the radiation detectors is carried out. As a result of the design of the measuring channel and/or as a result of the characteristic of the radiation source, the radiation of the radiation source is conducted directly onto the narrow bandpass interference filter and the downstream radiation detector. The simultaneous measurement of various gases and/or gas components of a gas mixture to be studied is possible by way of the arrangement of various radiation detectors in the deflection points along the optical path.

In one embodiment of the method according to the invention using the measuring device according to the invention, a reference detector having a reference narrow bandpass interference filter arranged in front of it is arranged in the measuring channel after the radiation detector having the narrow bandpass interference filter for the gas to be measured, wherein the reference narrow bandpass interference filter has a greater bandwidth than the narrow bandpass interference filter of the radiation detector, the transmission ranges of the two narrow bandpass interference filters are designed as overlapping, and the reference narrow bandpass interference filter permits a surrounding part outside the absorption band of the gas to be measured to be transmitted onto the reference detector and a signal ratio is formed between a detector signal of the radiation detector and a detector signal of the reference detector and the signal ratio is analyzed and a deviation in the signal ratio can thus be compensated for. It is important that for the narrow bandpass interference filter arranged in front of the detectors, it is true that the first narrow bandpass interference filter along the measuring channel always has a smaller transmission range than the second, i.e., the narrow bandpass interference filter downstream of the first narrow bandpass interference filter in the measuring channel.

The offset is generated in that the narrow bandpass interference filter in front of a reference detector transmits a larger spectral range and the reference detector detects a range outside the gas absorption band. Spectral changes which result, for example, due to deposits in the optical measuring channel or due to ambient temperature influences and also intensity drifts and spectral changes of the radiation source can thus be compensated for.

It is advantageous if the narrow bandpass interference filter in front of a reference detector transmits at least 30% of a wavelength range which is located outside the absorption band of the gas to be measured. This range can also be smaller or larger than 30%, however. It has to be ensured at least that the reference radiation detector detects a larger spectral range than the radiation detector, specifically with a spectral radiation component which is located outside the absorption band of the gas to be detected.

BRIEF DESCRIPTION OF THE DRAWING FIGURES

The invention will be explained in greater detail hereafter on the basis of exemplary embodiments.

In the figures of the associated drawings:

FIG. 10 shows a schematic illustration of an embodiment of the measuring device according to the invention having curved optical path, i.e., a curved measuring channel, a) sectional illustration, b) perspective illustration;

FIG. 11 shows a schematic illustration of an embodiment of the measuring device according to the invention, wherein the measuring device having the detectors and the optical path is formed integrated on a printed circuit board, a) perspective top view, b) side view;

DETAILED DESCRIPTION

Figure 4:
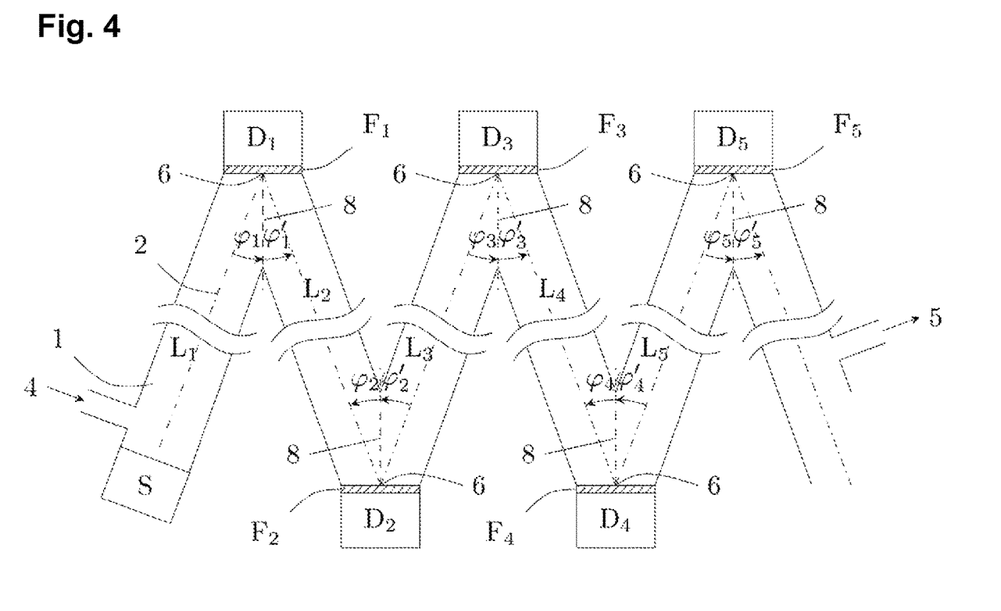
FIG. 4 shows a schematic illustration of the measuring device according to the invention for simultaneous measurement of different gases and gas concentrations.
Figure 5A:
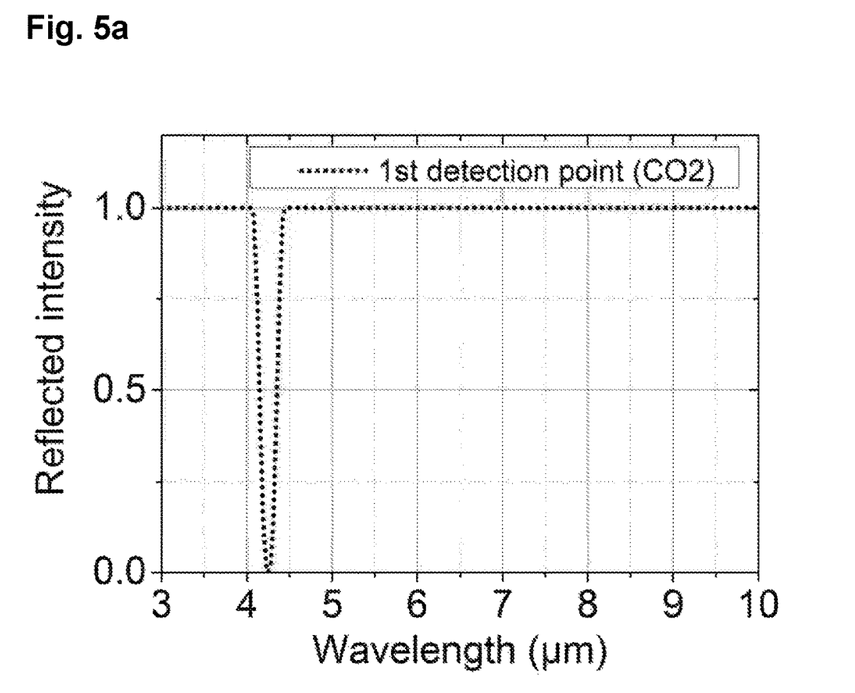
FIG. 5 shows reflected radiation intensity at the deflection points/bandpass interference filters $F_N$ arranged sequentially in the measuring channel in accordance with the gases to be detected.
Figure 5B:
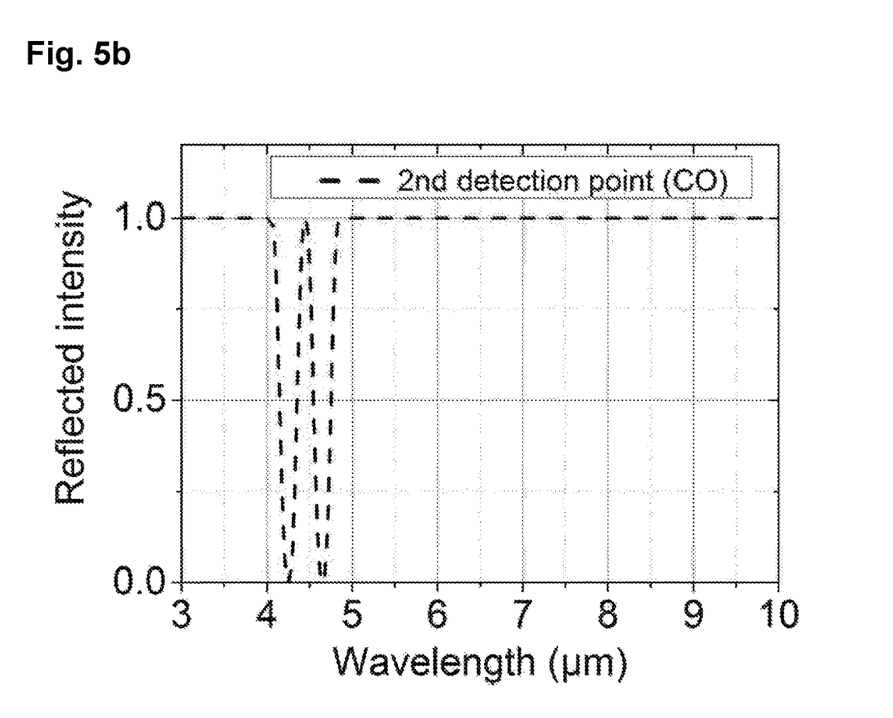
Figure 5C:
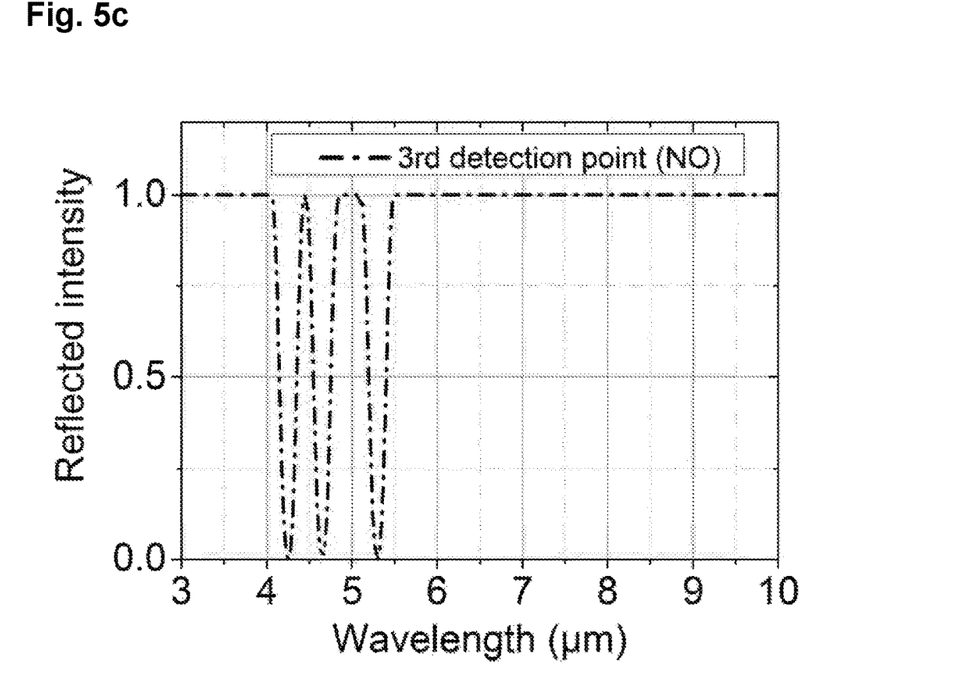
Figure 5D:
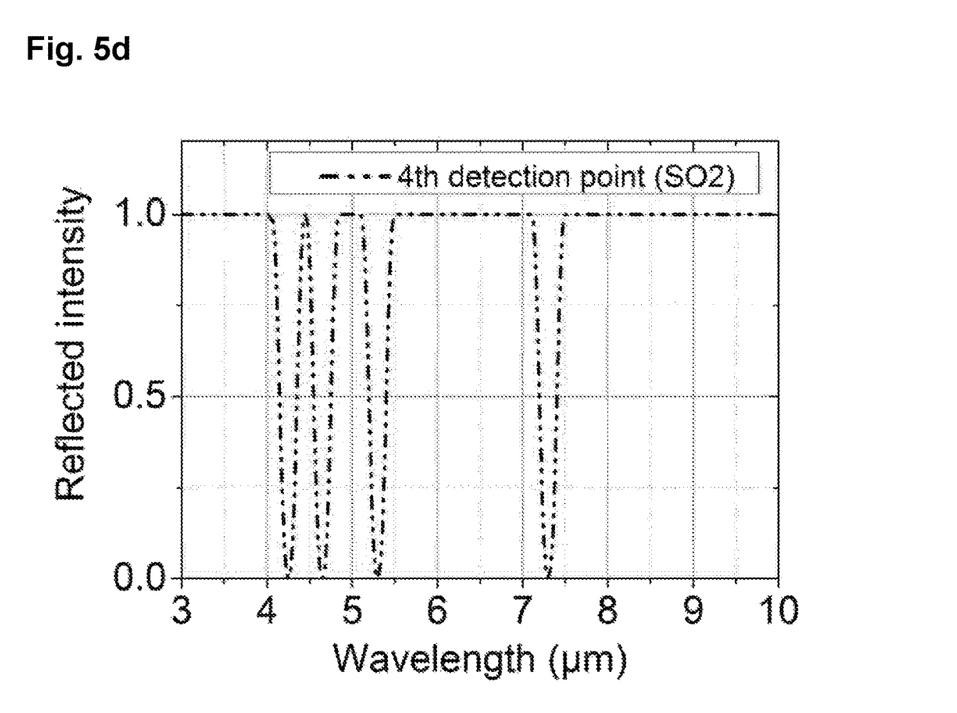
Figure 5E:
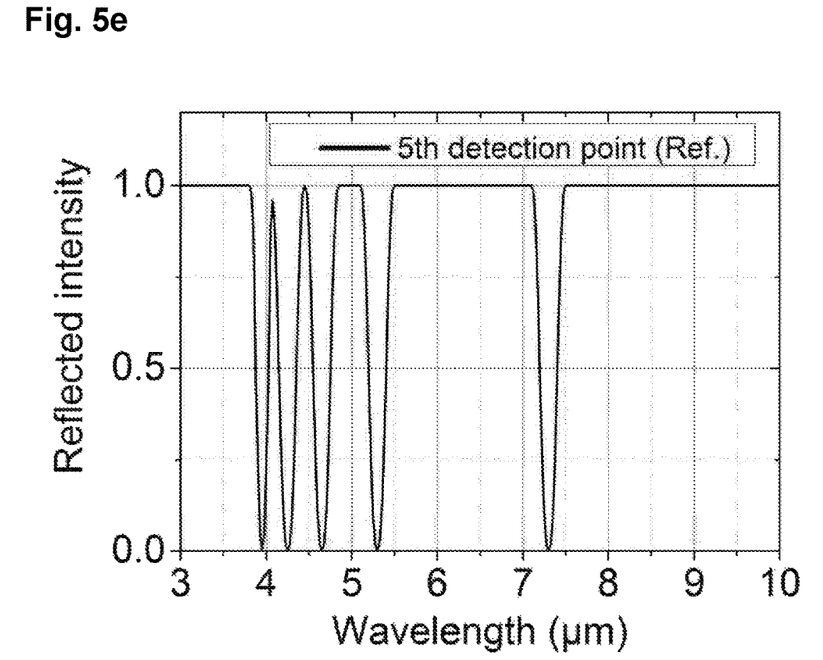
Figure 6:
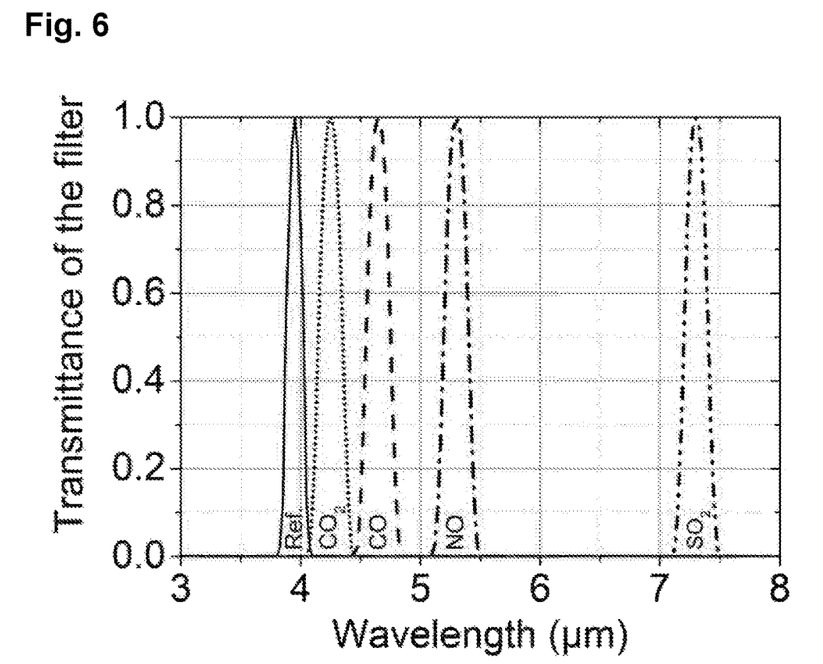
FIG. 6 shows transmission curves of the bandpass interference filters used by way of example for various gases.

FIG. 4 schematically shows a possible embodiment of the measuring device according to the invention. A gas is introduced by laminar flow into the measuring channel 1 via a gas inlet 4. However, the gas can also be introduced over the entire length of the optical path into the measuring channel. The gas inlet can also be designed as a gas-permeable membrane, where the gas diffuses spontaneously into the measuring channel 1. The IR radiation source S emits a beam bundle having a continuous spectrum, which is guided, for example, in a waveguide, the measuring channel 1, in which the gas or gas mixture is located, along an optical path 2 and is incident after an individually settable path length L1 on a narrow bandpass interference filter F1 at the angle φ1. The location of the filter defines a first deflection point 6 of the measuring radiation and only permits a specific wavelength or a very narrow wavelength band of the radiation through and reflects the remainder at the angle φ'1 back into the measuring channel 1. The transmission wavelength of the filter F1 corresponds in this case to the absorption wavelength of a gas G1 to be measured. FIGS. 4, 5, and 6 show the functionality and effect of the measuring device for measuring gas components in a gas mixture to be studied on the basis of an example, wherein the gas components are detected simultaneously at the successive detectors D, which are arranged at the deflection points 6 in the measuring channel 1 with corresponding narrow bandpass interference filters F. In FIG. 5, the radiation intensities reflected at the respective deflection points 6 are shown. The transmitted wavelength band is defined by the respective narrow bandpass interference filter. The radiation component transmitted by the first narrow bandpass interference filter F1 is detected by the detector D1 (FIG. 5a). The reflected radiation component is incident after a path length L2 on a further narrow bandpass interference filter F2 at the angle φ2 (FIG. 4). At this second deflection point 6, a further beam component of a gas G2 to be measured is filtered out and measured by the detector D2 (FIG. 5b). This can thus be continued (FIGS. 5c-e). It is clear from FIGS. 5a-e that the full radiation intensity is always incident on the detectors D. The required narrow bandpass interference filters F are arranged in the measuring channel 1 in accordance with the gas component to be detected and the required absorption path lengths. For example, a greater path length L is required for the detection of SO2 than for CO2. The gas can leave the measuring channel again via a gas outlet 5. The gas outlet 5 can also be designed as a gas-permeable membrane, where the gas diffuses spontaneously out of the measuring channel 1.

FIG. 6 shows, by way of example, the transmission curves of the narrow bandpass interference filters used for various gases.

Figure 7:
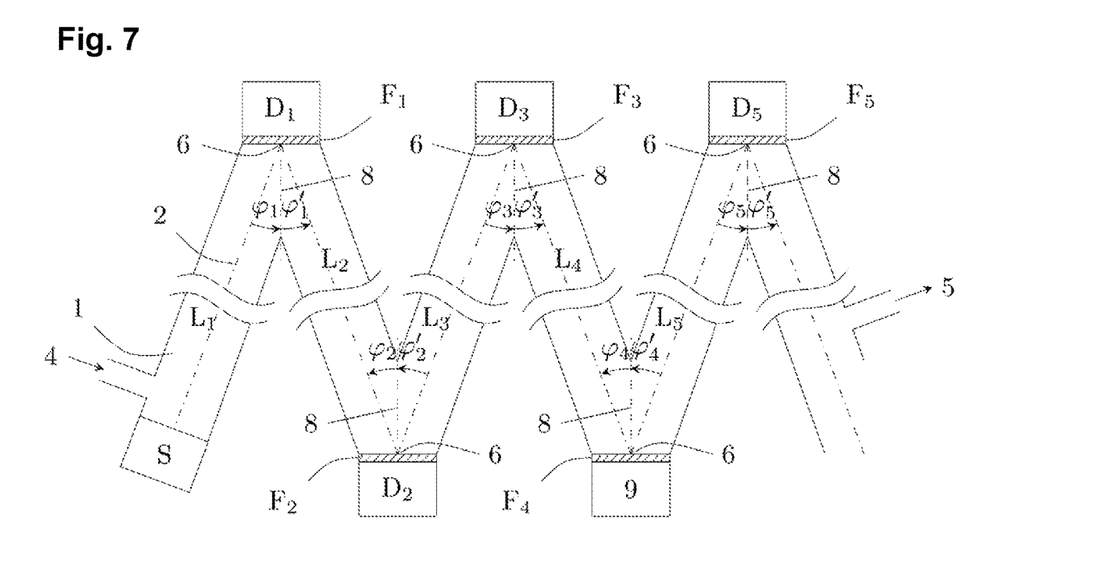
FIG. 7 shows a schematic illustration of the measuring device according to the invention with a reference measurement.

FIG. 7 shows a preferred embodiment of the measuring device according to the invention, wherein, at an arbitrary deflection point 6 in the measuring channel 1, a reference measurement is performed using a reference detector 9 at a wavelength at which no absorption takes place due to other gases present in the gas mixture or in the environment (for example, at 3.95 μm). A substantial stability improvement is achieved with the aid of this reference measurement, whereby, for example, signal changes as a result of intensity drifts of the radiation source S or dirt deposits in the measuring chamber can be compensated for.

Figure 8:
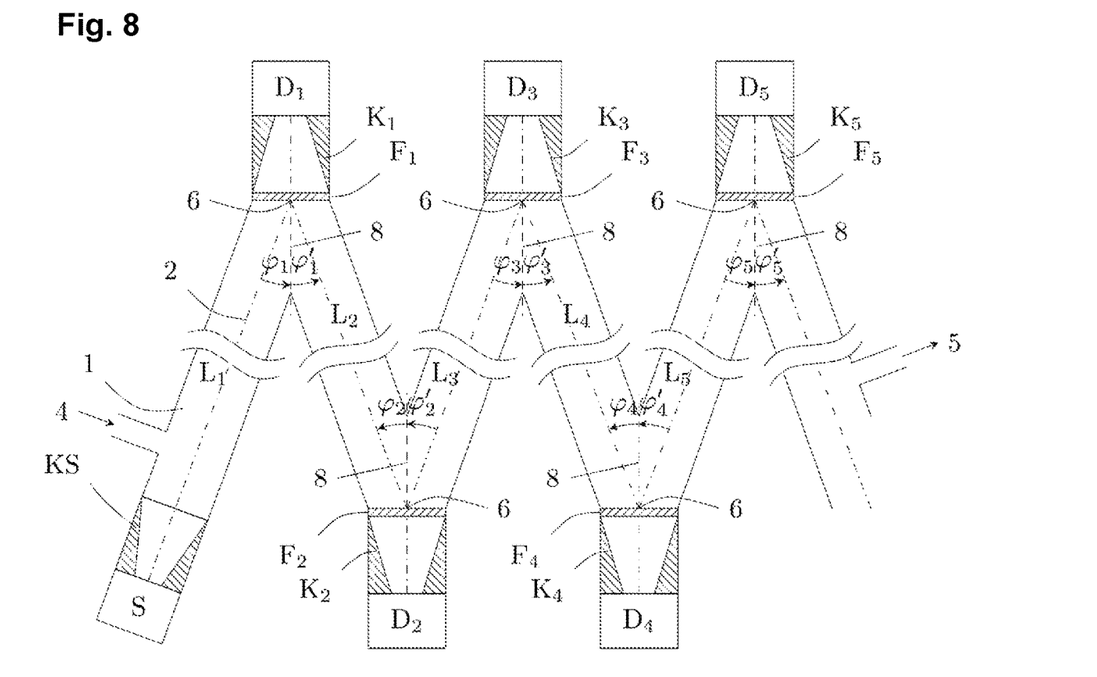
FIG. 8 shows a schematic illustration of an embodiment of the measuring device according to the invention having optical concentrators, which are arranged in front of the detectors and optionally also in front of the radiation source.

In a further preferred embodiment of the invention, an optical concentrator KS or a similar optical element (for example, mirror, lens) is arranged at the radiation source S, whereby the generated radiation is focused in the measuring channel 1. This is schematically shown in FIG. 8. In addition, an optical concentrator K1, K2, etc. is arranged behind each narrow bandpass interference filter F1, F2, etc., which focuses all beams transmitted through the filter onto the detector element D, so that a maximum detector signal is generated.

Figure 9:
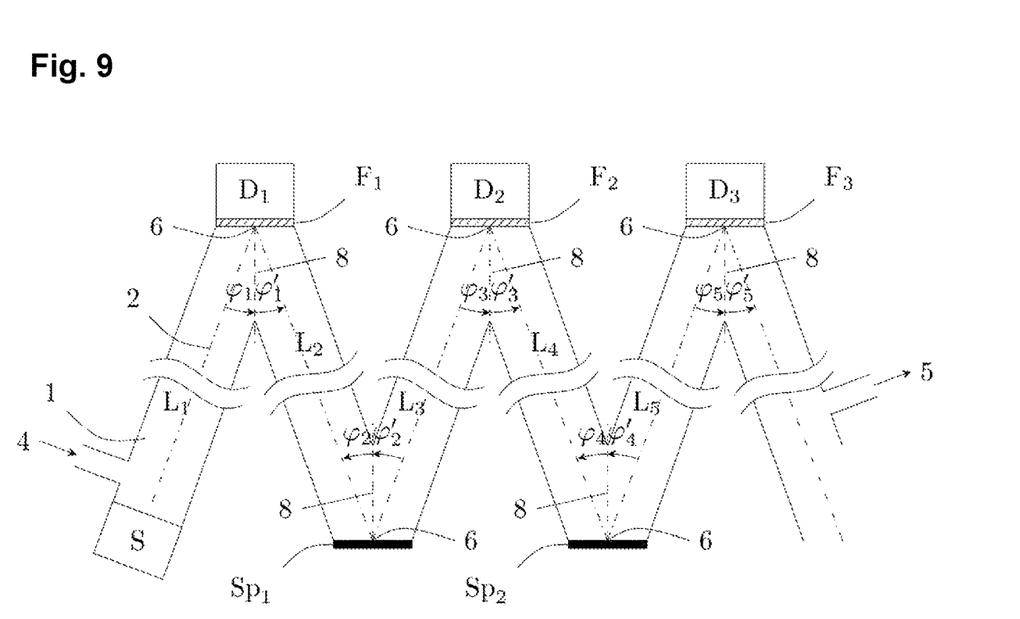
FIG. 9 shows a schematic illustration of an embodiment of the measuring device according to the invention having optical mirrors Sp at selected deflection points N to extend the absorption path length L.

In a further variant of the measuring device according to the invention, to extend the absorption path length L, a mirror Sp can be arranged at one or more deflection points 6 instead of a narrow bandpass interference filter F, which mirror completely reflects the incident radiation, and therefore the radiation is relayed to the next deflection point 6 (FIG. 9).

Figure 10A:
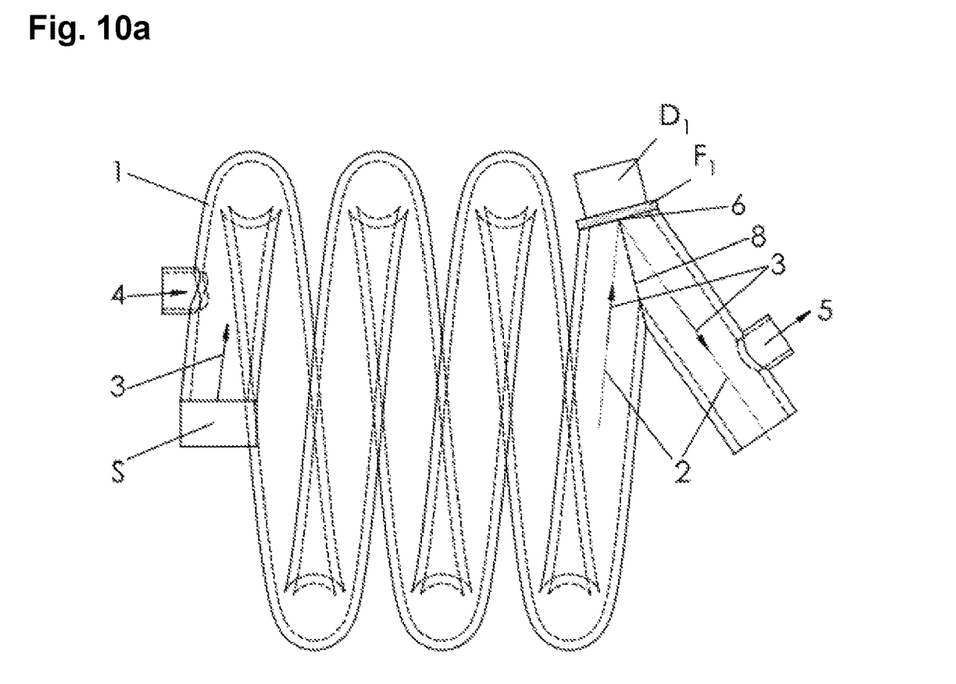
Figure 10B:
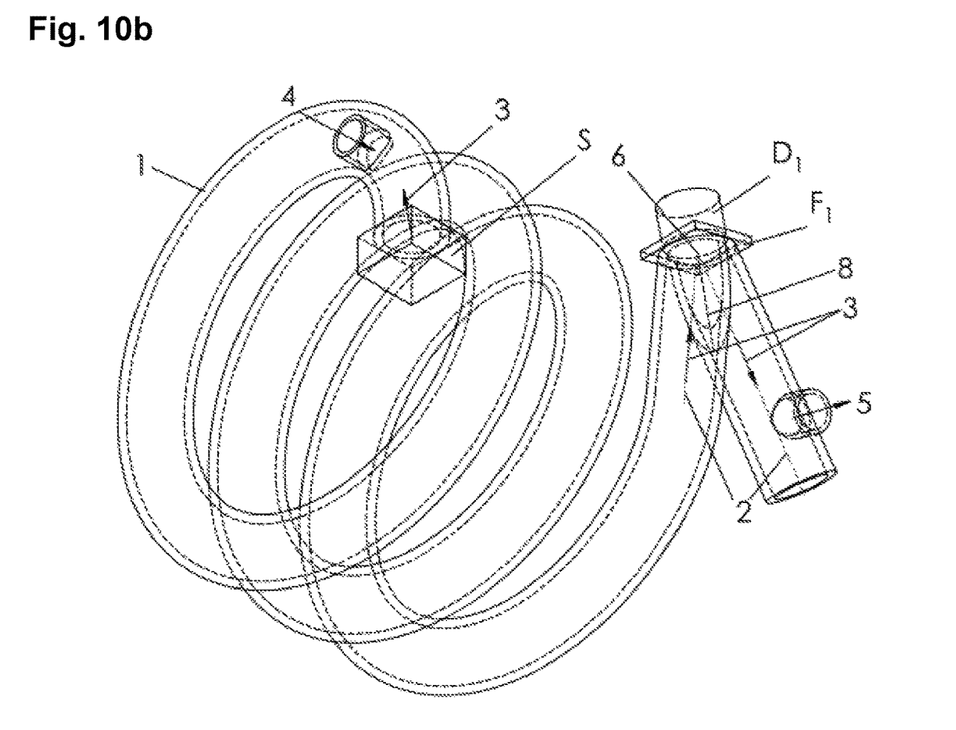

In another variant of the measuring device according to the invention, the optical path 2 and/or the measuring channel 1 can have a curved path, which can moreover be embodied three-dimensionally, for example, helical, so that the greatest possible absorption path length L can be housed in a small volume. This is schematically shown in FIGS. 10*a*, *b*. Detectors D according to the measuring device according to the invention are arranged at suitable points, i.e., at the deflection points along the curved optical path 2. A still more compact construction of the measuring device is possible due to the curved embodiment of the optical path 2. For illustration, only one detector D is shown in each of FIGS. 10*a, b* on the measuring channel 1 along the optical path 2, specifically at a first deflection point 6.

Figure 11A:
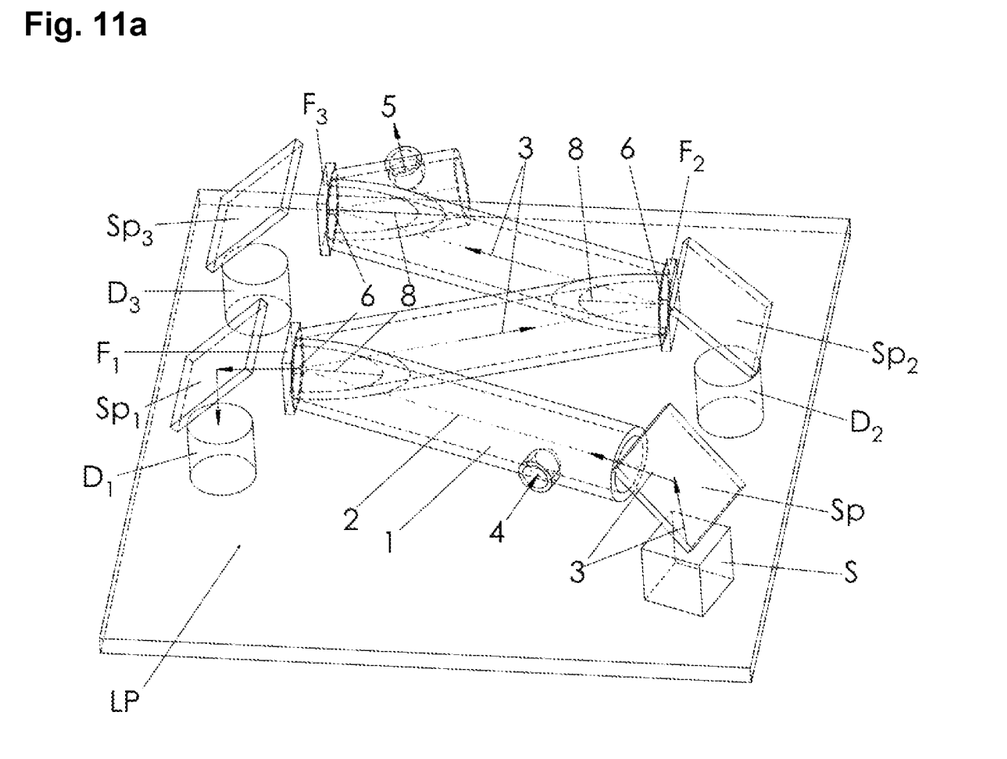
Figure 11B:
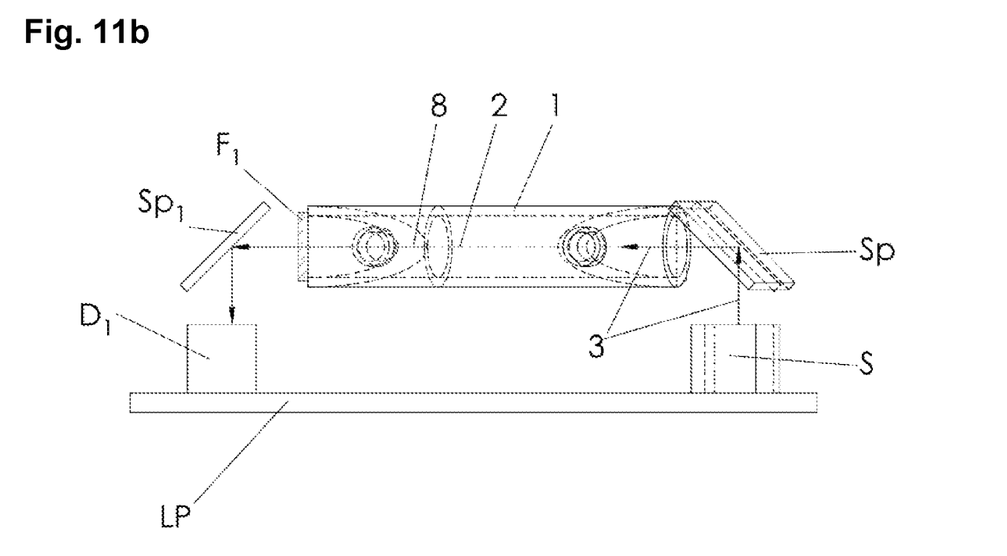

FIG. 11 shows a further embodiment of the measuring device according to the invention, wherein the measuring device is formed integrated with the detectors D and the optical path 2, i.e., the measuring channel 1, on a printed circuit board LP. The radiation source S and the detectors D are arranged in this case such that the most space-saving and compact arrangement possible can be implemented. The optical path 2, i.e., the measuring channel 1, is formed on the printed circuit board LP. To conduct the measurement radiation 3 of the radiation source S into the measuring channel 1, a mirror Sp is used to deflect the measurement radiation 3 into the optical path 2. This also applies to the beam deflection of the measurement radiation 3 onto the detectors D at the deflection points 6 along the measuring channel 1. A mirror Sp, inter alia, for beam deflection is arranged for this purpose behind the narrow bandpass interference filter F on which the measurement radiation is firstly incident, which mirror deflects the transmitted radiation component onto the detector D arranged on the printed circuit board LP. A substantially more compact construction can thus be implemented, since the horizontal extension can be reduced by the vertical integration of the components of the measuring device. The part of the measurement radiation reflected at the narrow bandpass interference filter F is conducted further along the optical path 2 through the measuring channel 1 until the measurement radiation 3 is incident on a further narrow bandpass interference filter F.

Figure 12:
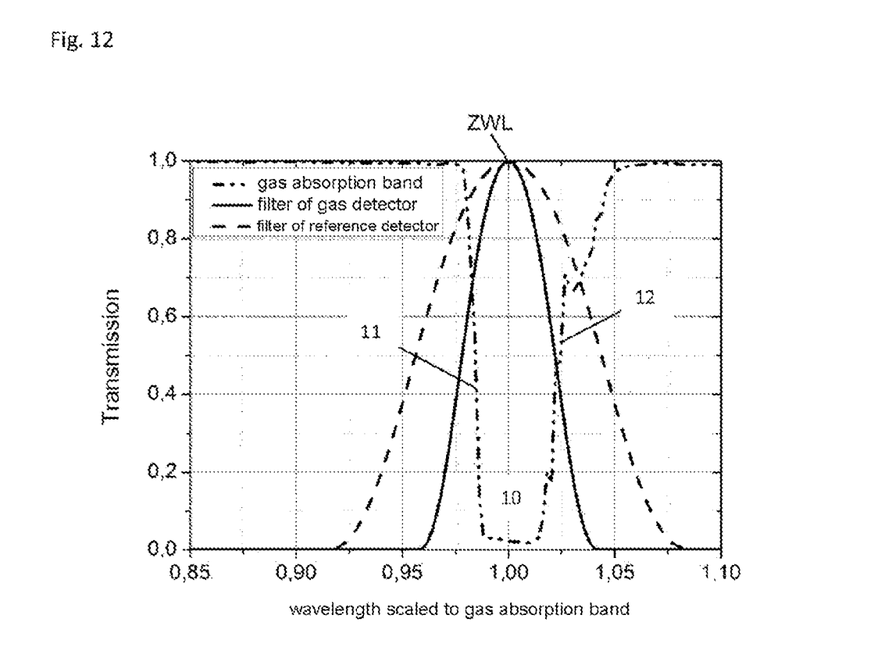
FIG. 12 shows a spectral curve of the transmission spectra of the radiation narrow bandpass interference filter, the reference narrow bandpass interference filter, and the gas to be detected, wherein the center wavelengths of the bandpass interference filters are identical.

The location of the respective bandpass interference filter of the radiation detector and reference detector for the absorption band of the gas to be studied is shown in FIG. 12. In this case, the center wavelengths of the bandpass interference filters F1, F2 can coincide. It is important that the bandwidths of the two bandpass interference filters F1, F2 are formed differently and one bandpass interference filter detects at least a part of the spectrum 11, 12 which lies outside the absorption band 10 of the gas to be detected, so that a bandpass interference filter sees a larger spectral radiation component, to thus generate an offset, as described above.

Figure 13:
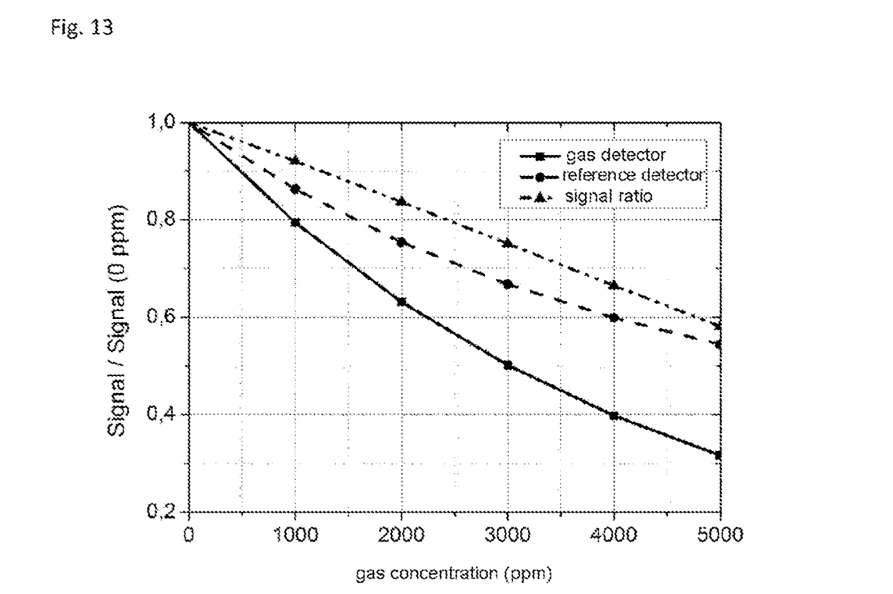
FIG. 13 shows the signal ratio between the signal of the radiation detector and the signal of the reference detector.

FIG. 13 shows the signal ratio of the radiation detector or gas detector and of the reference radiation detector and the signal ratio resulting therefrom in dependence on the gas concentration. Interfering influences, for example, intensity drifts of the radiation source, influence measuring channel and reference channel equally, and therefore the signal ratio does not change. In contrast, concentration changes of the gas result in a change of the signal ratio.

LIST OF REFERENCE SIGNS

F narrow bandpass interference filter, in short: filter
$F_1, F_2, \ldots, F_N$ filter 1, filter 2, . . . , filter N
G gas
G1, G2, . . . , GN gas 1, gas 2, . . . , gas N
D detector
$D_1, D_2, \ldots, D_N$ detector 1, detector 2, . . . , detector N
S radiation source
L absorption path length
$L_1, \ldots, L_N$ absorption path length 1, . . . , N
K concentrator
$K_1, \ldots, K_N$ concentrator 1, . . . , concentrator N
KS concentrator in front of the radiation source
Sp mirror
$Sp_1, \ldots, Sp_N$ mirror 1, . . . , mirror N
LP printed circuit board
$\varphi$ angle of incidence
$\varphi_1, \ldots, \varphi_N$ angle of incidence on the Nth narrow bandpass filter
1 measuring channel
2 optical path
3 propagation direction of the measurement radiation
4 gas inlet
5 gas outlet
6 deflection point
8 optical axis
9 reference detector
10 gas absorption band
11 one flank of a gas absorption band
12 another flank of a gas absorption band

The invention claimed is:

1. A measuring device for sensing different gases and gas concentrations comprising a radiation source, a measuring channel having an optical path and a gas interaction path, and radiation detectors arranged along the measuring channel, wherein the optical path has at least one deflection point, wherein a first narrow bandpass interference filter is arranged at a first deflection point and a first radiation detector is arranged downstream of the first narrow bandpass interference filter, and wherein the optical path and the gas interaction path in the measuring channel are identical, whereas the optical path has N deflection points and has an absorption path length $L_N$ from the radiation source up to the Nth deflection point, wherein N is a natural number greater than 1 and different gases can be measured using different absorption path lengths at the same time.

2. The measuring device as claimed in claim 1, wherein the optical path has an absorption path length $L_1$ from the radiation source up to the first deflection point.

3. The measuring device as claimed in claim 1, wherein the optical path is curved.

4. The measuring device as claimed in claim 3, wherein the optical path is helical.

5. The measuring device as claimed in claim 1, wherein the radiation source comprises a broadband laser having parallel radiation.

6. The measuring device as claimed in claim 1, wherein a focusing device for focusing or parallelization of the radiation emitted by the radiation source is arranged in front of the radiation source.

7. The measuring device as claimed in claim 1, wherein each narrow bandpass interference filter has an optical axis, and wherein the optical path and the optical axis of an Nth narrow bandpass interference filter enclose an angle $\varphi N$, wherein N is a natural number greater than 1.

8. The measuring device as claimed in claim 7, wherein the angle φN has a dimension of 0° to less than 90.

9. The measuring device as claimed in claim 8, wherein the angle φN has a dimension less than 50.

10. The measuring device as claimed in claim 8, wherein the angle φN has a dimension in the range of 30° to less than 50°.

11. The measuring device as claimed in claim 1, wherein an optical concentrator is arranged between the first narrow bandpass interference filter and the downstream radiation detector.

12. The measuring device as claimed in claim 1, wherein a substrate material of the first narrow bandpass interference filter consists of silicon, germanium, calcium fluoride, barium fluoride, or zinc selenide.

13. The measuring device as claimed in claim 1, wherein an optical mirror for extending the optical path is arranged at the deflection point, wherein the mirror has a planar or concave or convex surface.

14. The measuring device as claimed in claim 1, wherein a reference detector is arranged at the deflection point.

15. The measuring device as claimed in claim 1, wherein the measuring device is constructed modularly and the optical path and the gas interaction path are modularly extendable.

16. A method for measuring gases and gas concentrations, which uses the measuring device as claimed in claim 1, wherein the method includes the following steps:

introduction of a measurement radiation into a measuring channel containing the gas or gas mixture to be measured, incidence of the measurement radiation on the first narrow bandpass interference filter arranged at the first deflection point, wherein only radiation of a wavelength specified by the first narrow bandpass interference filter is incident on a radiation detector downstream of the first narrow bandpass interference filter, relay of the radiation reflected at the first narrow bandpass interference filter along the optical path in the measuring channel onto a second radiation detector, and analysis of the gas concentrations measured using the radiation detectors.

17. The method for measuring gases and gas concentrations as claimed in claim 16, wherein a reference detector having a reference narrow bandpass interference filter arranged in front of the reference detector is arranged in the measuring channel after the radiation detector having the first narrow bandpass interference filter for the gas to be measured, wherein the reference narrow bandpass interference filter has a greater bandwidth than the first narrow bandpass interference filter of the radiation detector, the transmission ranges of the reference and the first narrow bandpass interference filters overlap and the reference narrow bandpass interference filter permits a surrounding part outside the absorption band of the gas to be measured to be transmitted onto the reference detector, and a signal ratio is formed between a detector signal of the radiation detector and a detector signal of the reference detector, the signal ratio is analyzed, and a deviation in the signal ratio is thus compensated for.

* * * * *